(12) United States Patent
Morita et al.

(10) Patent No.: US 7,382,071 B2
(45) Date of Patent: Jun. 3, 2008

(54) ROTATING ELECTRIC MACHINE

(75) Inventors: Masao Morita, Tokyo (JP); Kouki Naka, Tokyo (JP); Masaya Inoue, Tokyo (JP); Akira Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 202 days.

(21) Appl. No.: 11/288,119

(22) Filed: Nov. 29, 2005

(65) Prior Publication Data

US 2006/0214526 A1    Sep. 28, 2006

(30) Foreign Application Priority Data

Mar. 23, 2005  (JP) ............................. 2005-083251

(51) Int. Cl.
*H02K 16/04*  (2006.01)
*H02K 3/00*  (2006.01)
(52) U.S. Cl. .................. 310/112; 310/195; 310/198; 310/254
(58) Field of Classification Search .............. 310/112, 310/195, 180, 184, 198
See application file for complete search history.

(56) References Cited

U.S. PATENT DOCUMENTS

| 4,371,801 A | * | 2/1983 | Richter | .................. 310/156.36 |
| 4,373,147 A | * | 2/1983 | Carlson, Jr. | .................. 318/48 |
| 5,861,690 A | | 1/1999 | Post | |

FOREIGN PATENT DOCUMENTS

JP    2003-9486    1/2003

* cited by examiner

*Primary Examiner*—Burton Mullins
(74) *Attorney, Agent, or Firm*—Oblon, Spivak, McClelland, Maier & Neustadt, P.C.

(57) ABSTRACT

A variable-speed rotating electric machine includes at least two armatures having respective armature coils for multiple phases, and a rotor having permanent magnets. The armatures are arranged concentrically with each other in such a manner that electrical angular positions of the individual armatures can be relatively varied in a circumferential direction. The armature coils of each phase are series-connected and the rotor is arranged concentrically with the armatures on the inside thereof.

10 Claims, 9 Drawing Sheets

ROTATING ELECTRIC MACHINE

BACKGROUND OF THE INVENTION

1. Field of the Invention

The present invention relates to a variable-speed permanent magnet rotating electric machine.

2. Description of the Background Art

A conventional variable-speed permanent magnet motor is disclosed in Japanese Patent Application Publication No. 2003-9486, for example. This motor is of a double-armature type provided with a generally ring-shaped rotor and a pair of armatures, in which one of the armatures is located inside the rotor and the other outside the rotor so that electrical angular positions of the inner and outer armatures can be relatively varied.

Specifically, in this motor of the Publication, the angular positions of the inner and outer armatures disposed concentrically inside and outside the rotor, respectively, are made relatively variable. The motor is controlled by a so-called field-weakening control method in which magnetic fields linked on each armature do not add up to a maximum level of magnetic flux but cancel out each other in part to decrease a total magnetic flux level. Field-weakening control serves to decrease combined voltages induced in armature coils of the two armatures in a high-speed range so that the voltages induced in the armature coils would not exceed a maximum voltage applicable to the armature coils. This arrangement makes it possible to easily perform variable-speed control operation of the motor and manufacture the motor with reduced electrical limitations and an increased degree of freedom of design.

As stated above, a conventional double-armature rotating electric machine has two stator-side armatures one of which is located inside a rotor and the other outside the rotor. Therefore, this type of rotating electric machine typically employs a structure in which the rotor is supported in a cantilever fashion. For this reason, it is difficult to hold the rotor in a stable position when the rotor is rotating. More specifically, although the rotor can be easily sustained by a cantilever support structure if the rotor is of a type having a small axial length, it is difficult to hold the rotor in a stable fashion if the rotor has a large axial length. A previously known arrangement for supporting the rotating rotor in a stable fashion is to support the rotor by a pair of bearings or the like located at both ends of a rotor shaft. This prior art approach has a problem that a considerably complicated rotor support structure is required.

SUMMARY OF THE INVENTION

In light of the aforementioned problem of the prior art, it is an object of the invention to provide a rotating electric machine of which rotating speed can be easily varied in a controlled fashion by varying relative electrical angular positions of multiple armatures, wherein a rotor is supported in a reliable fashion at both ends thereof by a relatively simple structure with high stiffness.

According to a principal feature of the invention, a variable-speed rotating electric machine using permanent magnets includes at least two armatures having respective armature coils for multiple phases, and a rotor having the aforementioned permanent magnets. The armatures are arranged concentrically with each other in such a manner that electrical angular positions of the individual armatures can be relatively varied in a circumferential direction. The armature coils of each phase are series-connected and the rotor is arranged concentrically with the armatures on the inside thereof.

The rotating electric machine of the invention can be easily run at variable speeds in a controlled fashion by varying the electrical angular positions of the concentrically arranged multiple armatures in the circumferential direction. This rotating electric machine can employ a support structure for supporting the rotor by a pair of bearings or the like located at both ends of a rotor shaft. Since this support structure supports the rotor with high stiffness, the same can be easily applied to commonly available rotating electric machines of which rotor has a large axial length.

These and other objects, features and advantages of the invention will become more apparent upon reading the following detailed description along with the accompanying drawings.

DESCRIPTION OF THE PREFERRED EMBODIMENTS

Specific embodiments of the present invention are now described in detail with reference to the accompanying drawings.

First Embodiment

Figure 1:
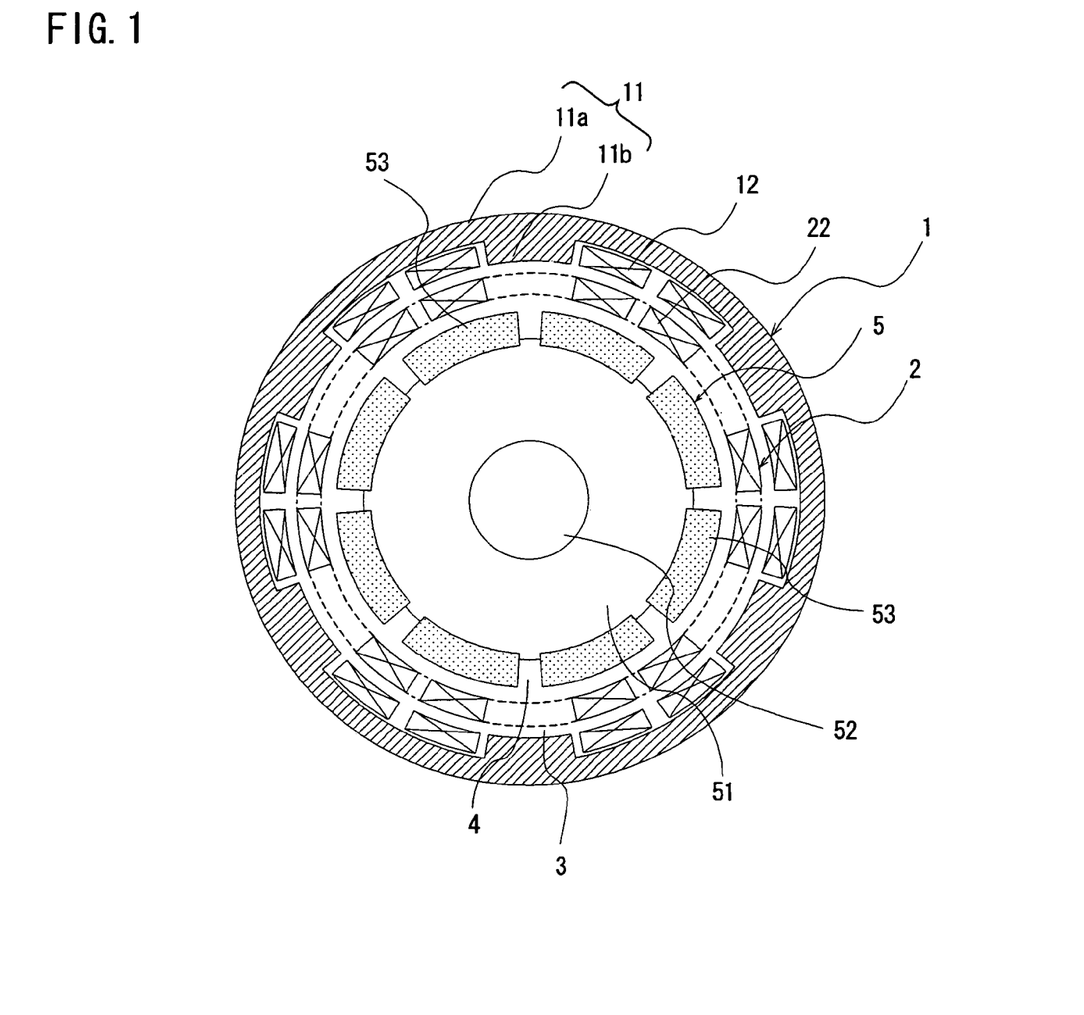
FIG. 1 is a transverse cross-sectional view of a variable-speed permanent magnet motor according to a first embodiment of the invention.
Figure 2:
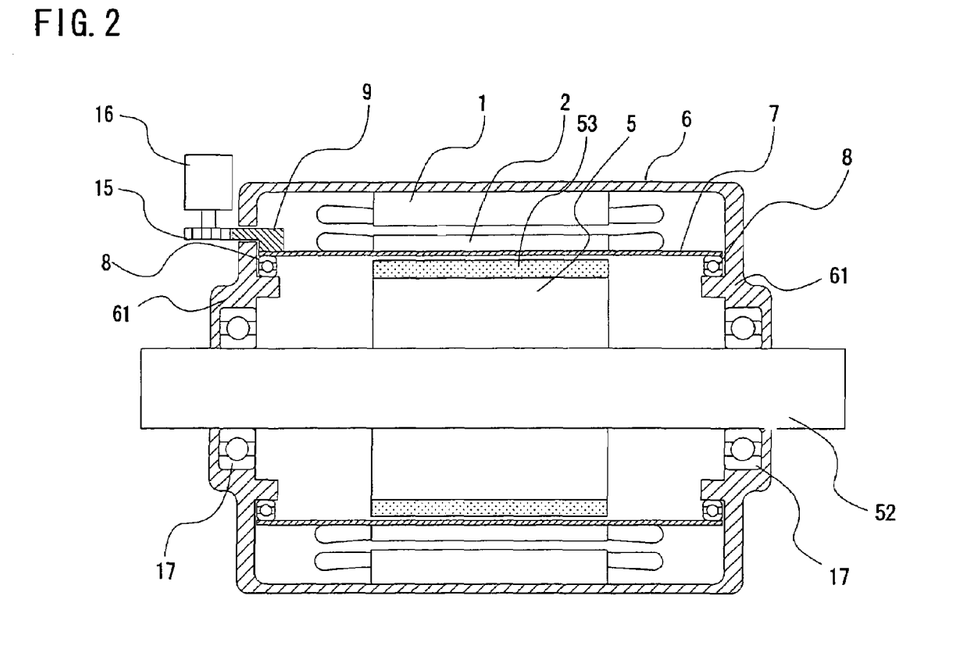
FIG. 2 is a longitudinal cross-sectional view of the motor of FIG. 1.

FIG. 1 is a transverse cross-sectional view and FIG. 2 is a longitudinal cross-sectional view of a variable-speed permanent magnet motor according to a first embodiment of the invention.

The variable-speed permanent magnet motor of this embodiment includes a first armature 1, a second armature 2 located inside the first armature 1, and a rotor 5 located inside the second armature 2. The first and second armatures 1, 2 are mounted concentrically and separated by a narrow gap 3 from each other. The second armature 2 and the rotor 5 are also mounted concentrically and separated by a magnetic gap 4 from each other. While the motor of the first embodiment is an 8-pole, 6-slot permanent magnet motor as shown in FIG. 1, the invention is not limited to the illustrated example in terms of the numbers of poles and slots.

The first armature 1 includes an armature core 11, in which a plurality of teeth 11b are formed on a curved inner surface of a cylindrical core back 11a at regular intervals along a circumferential direction, and armature coils 12 for individual phases which are fitted in slots formed by the successive teeth 11b. The first armature 1 is fixed to a curved inner surface of a housing 6.

The second armature 2 includes armature coils 22 for multiple phases. These armature coils 22 are molded into a single structure by using a nonmagnetic nonconductive material, such as molding resin. The second armature 2 is fixed to a curved outer surface of a support cylinder 7 which is made of a nonmagnetic nonconductive material, such as a plastic, and mounted in the housing 6. The support cylinder 7 is rotatably supported by bearings 8 which are fitted on brackets 61 located at left and right ends of the housing 6, the support cylinder 7 being fitted with a face gear 9 which can be turned within a prescribed range of mechanical angle. The face gear 9 meshes with a spur gear 15 which is located outside the housing 6 and fitted on a shaft of a driving motor 16.

When the driving motor 16 turns the face gear 9 by a specific mechanical angle via the spur gear 15, the second armature 2 turns by a corresponding mechanical angle together with the support cylinder 7 and, as a consequence, electrical angular positions of the first and second armatures 1, 2 are relatively varied in the circumferential direction. A technique of varying the values of combined voltages induced in the armature coils 12, 22 of the first and second armatures 1, 2 by varying a relative electrical angle between the two armatures 1, 2 in the circumferential direction is not described in detail here, because this technique is conventional.

The armature coils 12 and 22 of the first and second armatures 1, 2 are connected in series for each phase. Although not illustrated, the armature coils 12 and 22 of the individual phases of the first and second armatures 1, 2 are connected by cables having sufficient lengths such that the cables would not break even when the second armature 2 is fully turned to extremes of the aforementioned prescribed angular range in the circumferential direction.

The rotor 5 includes a field core 51, a shaft 52 fitted in the field core 51 on a central axis thereof, and a plurality of permanent magnets 53 attached to a curved outer surface of the field core 51 at regular intervals along the circumferential direction. The shaft 52 is rotatably supported at both ends by bearings 17 which are fitted in left and right brackets 61 of the housing 6. This kind of structure for supporting both ends of the shaft 52 of the rotor 5 by means of the bearings 17 is mechanically sturdy and is equivalent to a support structure commonly used in conventional rotating electric machines, so that the support structure of the embodiment is also applicable to commonly available rotating electric machines of which rotor has a large axial length.

Figure 3:
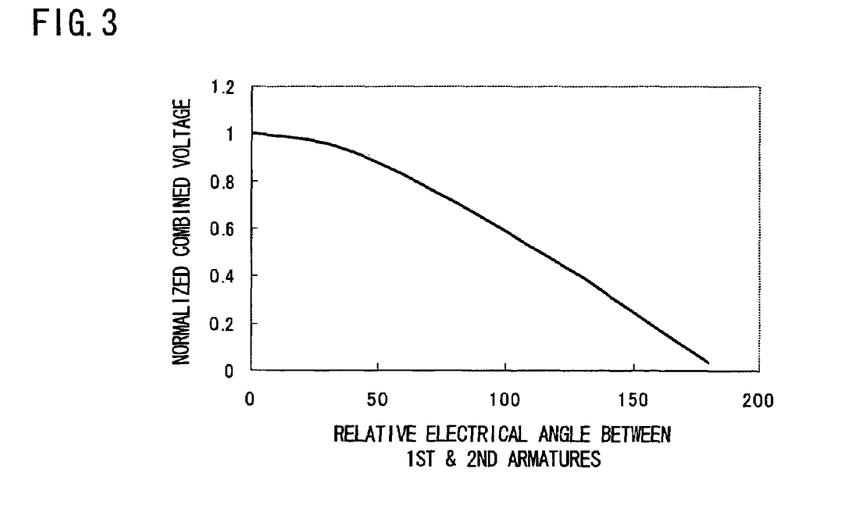
FIG. 3 is a graphical representation of a characteristic curve obtained by analyzing electromagnetic fields produced by the sums of voltages (combined voltages) induced in armature coils of individual phases when the electrical angular positions of first and second armatures are relatively varied in a circumferential direction in the motor shown in FIGS. 1 and 2.

FIG. 3 is a graphical representation of a characteristic curve obtained by analyzing electromagnetic fields produced by the sums of voltages (combined voltages) induced in the armature coils 12, 22 of the individual phases when the electrical angular positions of the first and second armatures 1, 2 are relatively varied in the circumferential direction in the motor shown in FIGS. 1 and 2. The horizontal axis of FIG. 3 represents a relative electrical angle between the first and second armatures 1, 2 in the circumferential direction and the vertical axis represents a normalized combined voltage induced in the armature coils 12, 22 of one phase of the two armatures 1, 2.

As will be recognized from FIG. 3, it is possible to vary the combined voltage induced in the armature coils 12, 22 of each phase by changing the relative electrical angle between the first and second armatures 1, 2 in the permanent magnet motor of the first embodiment structured as discussed above. This feature of the embodiment makes it possible to easily run the motor at variable speeds in a controlled fashion by field-weakening control and manufacture the motor with reduced electrical limitations and an increased degree of freedom of design.

When two armatures 1, 2 are concentrically arranged as in the present embodiment, the relative electrical angle between the first and second armatures 1, 2 should be set to 180 degrees to reduce the combined voltage of each phase to approximately zero as can be seen from FIG. 3. In the case of a motor having three concentrically arranged armatures, however, the vector sum of voltages induced in coils of each phase of the three armatures can be approximately zeroed by setting the relative electrical angle from one to the next of the three armatures to 120 degrees.

In the above-described motor of the first embodiment, the first armature 1 has the armature core 11 and is located in an outermost position as illustrated in FIGS. 1 and 2, so that the first armature 1 is heavier than the second armature 2. In the motor of the first embodiment, the second armature 2 having a lighter weight, and thus a smaller moment of inertia, is rotated by the driving motor 16 as discussed above. This is advantageous for quickly varying the relative electrical angle between the first and second armatures 1, 2. The aforementioned structure of the first embodiment in which the heavier first armature 1 is fixedly mounted and the lighter second armature 2 is rotatably mounted is advantageous from this point of view as well.

Figure 4:
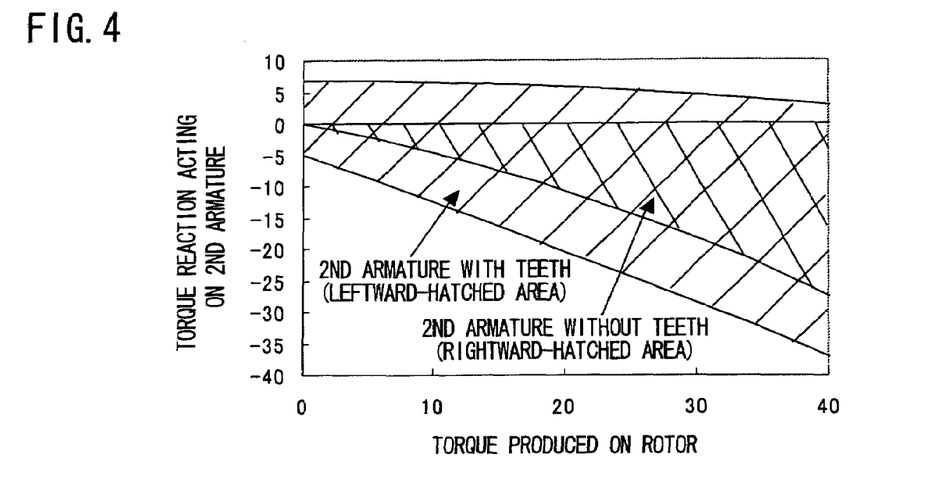
FIG. 4 is a graphical representation of characteristic curves showing results of a study of the magnitude of a torque reaction acting on the second armature due to a torque produced on a rotor in a structure of the first embodiment in which the second armature has no toothed core and in a modified structure in which the second armature has a toothed core.

FIG. 4 is a graphical representation of characteristic curves showing results of a study of the magnitude of a torque reaction acting on the second armature 2 due to a torque produced on the rotor 5 in the structure of the first embodiment in which the second armature 2 has no toothed core and in a modified structure in which the second armature 2 has a toothed core. The horizontal axis of FIG. 4 represents the torque produced on the rotor 5 and the vertical axis represents the torque reaction acting on the second armature 2. The magnitude of the torque reaction acting on the second armature 2 varies with the relative electrical angle between the first and second armatures 1, 2. Ranges of the magnitude of the torque reaction are shown by hatching in FIG. 4 for both structures.

It is seen from FIG. 4 that the absolute value of the torque reaction acting on the second armature 2 is smaller in the structure using the second armature 2 with no toothed core than in the structure using the second armature 2 with the toothed core. In the structure of the first embodiment, the second armature 2 has no toothed core while the first armature 1 has the teeth 11b formed on the armature core 11. This structure of the embodiment is advantageous in that the magnitude of the torque reaction acting on the second armature 2 is small. This feature of the embodiment, combined with the aforementioned feature that the heavier first armature 1 is fixedly mounted, produces an advantageous effect that a structure for supporting the second armature 2 can be easily configured.

It is appreciated from the foregoing discussion that the variable-speed permanent magnet motor of the first embodiment is advantageous in that the motor can be easily run at variable speeds in a controlled fashion by relatively varying the electrical angular positions of the first and second armatures 1, 2 in the circumferential direction and thereby varying the values of the combined voltages induced in the armature coils 12, 22 of the individual phases. Additionally, because the shaft 52 of the rotor 5 is supported at both ends by the bearings 17 of a simple structure, the rotor 5 is supported with high stiffness. This support structure of the embodiment can be easily applied to commonly available rotating electric machines of which rotor has a large axial length.

Furthermore, in the variable-speed permanent magnet motor of the first embodiment, the first armature 1 is fixedly mounted and the second armature 2 is rotatably mounted, in which the second armature 2 is provided with no toothed core. Accordingly, the moment of inertia of the second armature 2 and the torque reaction acting on the second armature 2 are so small that the relative electrical angle between the first and second armatures 1, 2 can be quickly varied in the circumferential direction.

While the foregoing first embodiment has been described with reference to an example in which the two armatures 1, 2 are concentrically arranged, the invention is not limited to the structure of this specific example but is also applicable to a motor having three or more concentrically arranged armatures, yet offering the same advantageous effects as discussed above.

Second Embodiment

Figure 5:
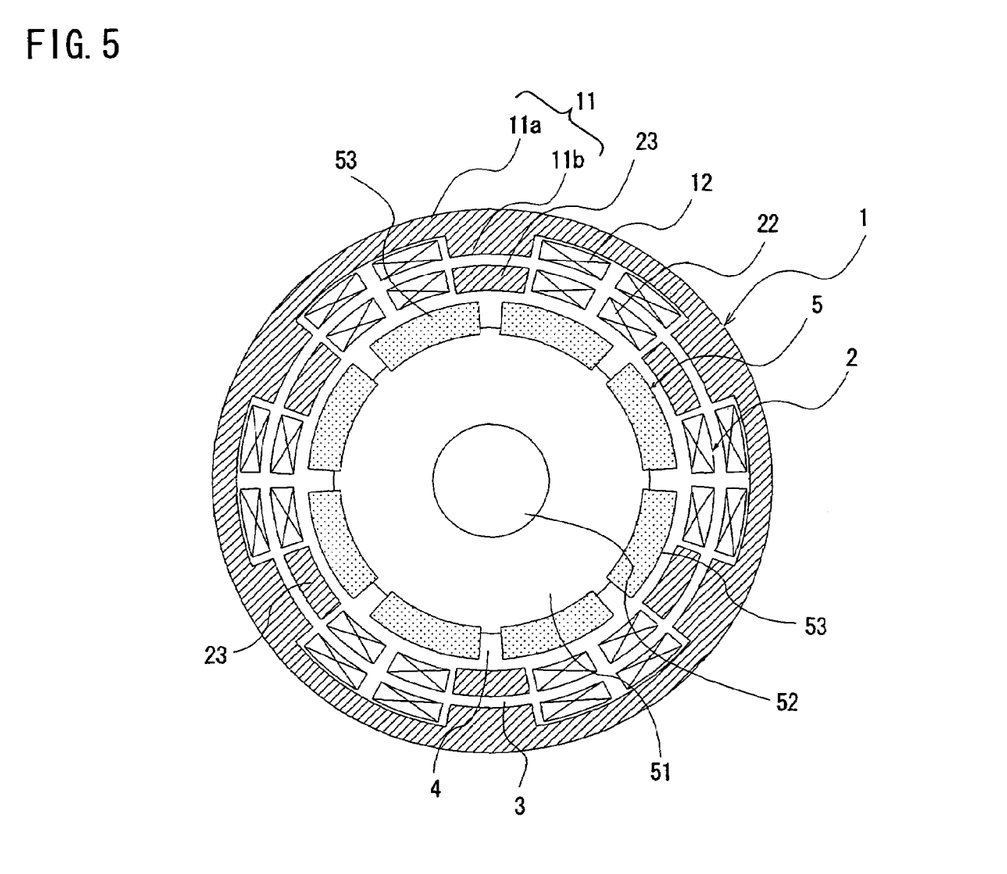
FIG. 5 is a transverse cross-sectional view of a variable-speed permanent magnet motor according to a second embodiment of the invention.

FIG. 5 is a transverse cross-sectional view of a variable-speed permanent magnet motor according to a second embodiment of the invention, in which elements identical or equivalent to those of the first embodiment shown in FIGS. 1 and 2 are designated by the same reference numerals.

What is characteristic of the motor of the second embodiment is that the motor includes a first armature 1 having the same structure as the first embodiment and a second armature 2 which is provided with armature coils 22 for multiple phases and a plurality of teeth 23 located between one armature coil 22 and the next. The armature coils 22 and the teeth 23 are molded into a single structure by using a nonmagnetic nonconductive material, such as molding resin.

When both of the first and second armatures 1, 2 are provided with the teeth 11b, 23 as in the second embodiment, low-reluctance magnetic paths for passing magnetic flux produced by the permanent magnets 53 fitted to the rotor 5 are more easily formed than with the second armature 2 of the first embodiment having no teeth (FIG. 1). As a result, flux linkages on the first and second armatures 1, 2 increase.

A torque produced on the rotor 5 is proportional to the product of the magnetic flux produced by the permanent magnets 53 and a magnetomotive force produced by the armature coils 22, so that the greater the magnetic flux produced by the permanent magnets 53, the greater the torque produced on the rotor 5. Thus, the aforementioned structure of the second embodiment in which both the first and second armatures 1, 2 are provided with the teeth 11b, 23 is advantageous in that the reluctance of the magnetic paths is minimized, allowing the magnetic flux to pass easily, and a large torque is produced on the rotor 5.

Now, a relationship between the number of poles formed by the permanent magnets 53 and the number of slots formed in each of the first and second armatures 1, 2 is considered with reference to the motor of the second embodiment in which both of the first and second armatures 1, 2 are provided with the teeth 11b, 23.

Figure 6A:
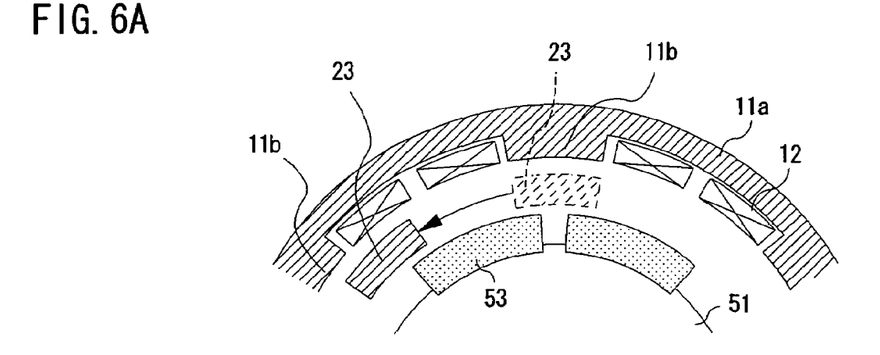
FIG. 6A is a fragmentary transverse cross-sectional view of the 8-pole, 6-slot motor of FIG. 5 showing a state in which the electrical angle of each tooth of a second armature relative to each tooth of a first armature changes from 0 degrees to 180 degrees.
Figure 6B:
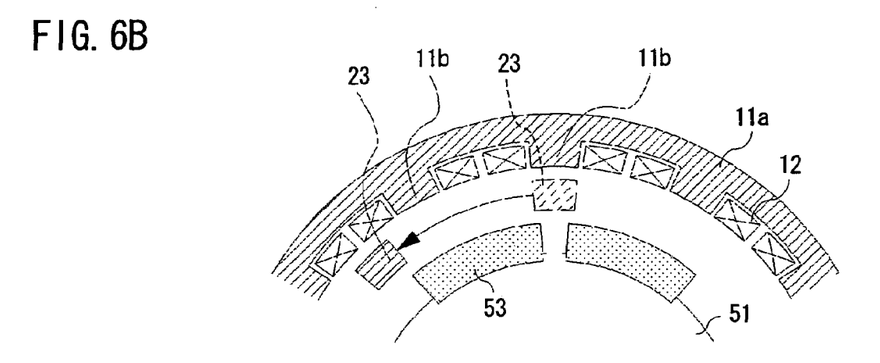
FIG. 6B is a fragmentary transverse cross-sectional view of an 8-pole, 12-slot motor shown as a comparative example showing a state in which the electrical angle of each tooth of a second armature relative to each tooth of a first armature changes from 0 degrees to 180 degrees.

As illustrated in FIG. 5, the motor of the second embodiment is an 8-pole, 6-slot permanent magnet motor. FIG. 6A is a fragmentary transverse cross-sectional view of this 8-pole, 6-slot motor showing a state in which the electrical angle of each tooth 23 of the second armature 2 relative to each tooth 11b of the first armature 1 changes from 0 degrees to 180 degrees. FIG. 6B is a fragmentary transverse cross-sectional view of an 8-pole, 12-slot motor shown as a comparative example showing a state in which the electrical angle of each tooth 23 of a second armature 2 relative to each tooth 11b of a first armature 1 changes from 0 degrees to 180 degrees.

In the case of the 8-pole, 6-slot motor, an electrical angle of 180 degrees corresponds to a mechanical angle of 45 degrees. Also, a tooth-to-tooth angular interval is 60 degrees in the 8-pole, 6-slot motor of FIG. 6A as 6 slots are formed in each of the first and second armatures 1, 2, whereas a tooth-to-tooth angular interval is 30 degrees in the 8-pole, 12-slot motor of FIG. 6B as 12 slots are formed in each of the first and second armatures 1, 2.

Referring to FIG. 6A, when the second armature 2 moves from a 0-degree position shown by broken lines where the teeth 23 of the second armature 2 are located face to face with the corresponding teeth 11b of the first armature 1 to a 180-degree position shown by solid lines in terms of relative electrical angle in the 8-pole, 6-slot motor, each of the teeth 23 of the second armature 2 is located at a position just behind an adjacent tooth 11b which is separated from the 0-degree position by a mechanical angle of 60 degrees, or the tooth-to-tooth angular interval of the first armature 1. Referring to FIG. 6B, on the other hand, when the second armature 2 moves from a 0-degree position shown by broken lines where the teeth 23 of the second armature 2 are located face to face with the corresponding teeth 11b of the first armature 1 to a 180-degree position shown by solid lines in terms of relative electrical angle in the 8-pole, 12-slot motor, each of the teeth 23 of the second armature 2 is located at a position just beyond an adjacent tooth 11b which is separated from the 0-degree position by a mechanical angle of 30 degrees, or the tooth-to-tooth angular interval of the first armature 1.

Figure 7:
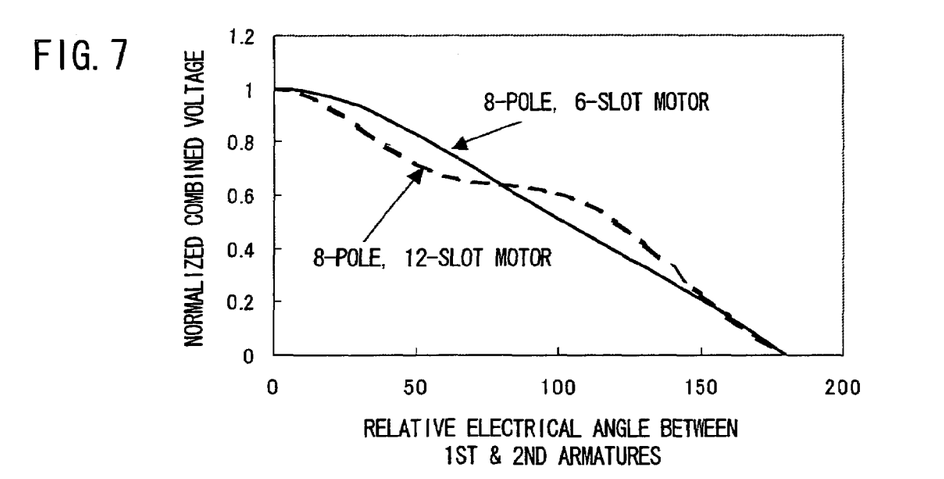
FIG. 7 is a graphical representation of characteristic curves obtained by analyzing electromagnetic fields produced by the sums of voltages (combined voltages) induced in armature coils of individual phases when the electrical angular positions of the first and second armatures are relatively varied in a circumferential direction in the 8-pole, 6-slot motor of FIG. 6A and in the 8-pole, 12-slot motor of FIG. 6B.

FIG. 7 is a graphical representation of characteristic curves obtained by analyzing electromagnetic fields produced by the sums of voltages (combined voltages) induced in the armature coils 12, 22 of the individual phases when the electrical angular positions of the first and second armatures 1, 2 are relatively varied in the circumferential direction in the 8-pole, 6-slot motor and in the 8-pole, 12-slot motor. The horizontal axis of FIG. 7 represents a relative electrical angle between the first and second armatures 1, 2 in the circumferential direction and the vertical axis represents a normalized combined voltage induced in the armature coils 12, 22 of one phase of the two armatures 1, 2.

It is recognized from FIG. 7 that when the teeth 23 of the second armature 2 are moved from the 0-degree position to the 180-degree position as shown in FIG. 6A and the relative electrical angle between the first and second armatures 1, 2 increases, the combined voltage induced in the armature coils 12, 22 of each phase gradually decreases in the 8-pole, 6-slot motor. In the case of the 8-pole, 12-slot motor, on the other hand, the combined voltage induced in the armature coils 12, 22 of each phase does not decrease just gradually with changes in the relative electrical angle between the first and second armatures 1, 2. Specifically, the characteristic curve of the 8-pole, 12-slot motor is relatively flat in a region at around a relative electrical angle of 90 degrees where the combined voltage varies only little even when the relative electrical angle between the first and second armatures 1, 2 is changed.

The variable-speed permanent magnet motor of the second embodiment is intended to be run by field-weakening control by allowing changes in the relative electrical angle between the first and second armatures 1, 2. Therefore, the aforementioned nature of the 8-pole, 12-slot motor of FIG. 6B in which the amount of change in the combined voltages is small in relation to changes in the relative electrical angle between the first and second armatures 1, 2 in the region at around the relative electrical angle of 90 degrees is not preferable for performing field-weakening control operation.

In the motor of the second embodiment, the number of slots is made smaller than the number of poles as described above. Therefore, there is a relationship approximately expressed by a linear function between the relative electrical angle between the first and second armatures 1, 2 and the combined voltage induced in the armature coils 12, 22 of each phase in the motor of the second embodiment. This means that the combined voltage induced in the armature coils 12, 22 of each phase gradually decreases with an increase in the relative electrical angle between the first and second armatures 1, 2, so that the motor can be easily run at variable speeds in a controlled fashion by field-weakening control.

Furthermore, because the reluctance of the magnetic paths is minimized allowing the magnetic flux to pass easily due to the provision of the teeth 11b, 23 of both the first and second armatures 1, 2, the aforementioned structure of the second embodiment offers an advantageous effect that a large torque is produced on the rotor 5.

While the second embodiment has thus far been described with reference to an example in which the motor has two concentrically arranged armatures 1, 2, the structure of the second embodiment is also applicable to a motor having three or more concentrically arranged armatures if the relationship between the number of poles and the number of slots is properly determined as briefly described above. This point is discussed in further detail below.

Expressing the number of concentrically arranged armatures by N, a maximum relative electrical angle θe at which the vector sum of voltages induced in coils of each phase of N number of armatures is zeroed is given by equation (1) below:

$$\theta e = 2\pi/N \quad (1)$$

Expressing the number of poles formed by the permanent magnets 53 by Np, a maximum relative mechanical angle θm is expressed by equation (2) below by using the maximum relative electrical angle θe of equation (1):

$$\theta m = 2\theta e/Np \quad (2)$$

If the number of slots is Ns, a slot-to-slot angular interval θs is expressed by equation (3) below:

$$\theta s = 2\theta e/Ns \quad (3)$$

A condition necessary for ensuring a gradual decrease of the combined voltage induced in the armature coils 12, 22 is that the slot-to-slot angular interval θs is larger than the maximum relative mechanical angle θm, or θm<θs. This relationship can be expressed as follows from the aforementioned equations (1) to (3):

$$Ns < N \cdot Np/2 \quad (4)$$

It is understood from the foregoing discussion that whether the motor is of a type having two armatures or three or more armatures, it is possible to create the aforementioned phenomenon in which the combined voltage induced in the armature coils of each phase gradually decreases with an increase in the relative electrical angle between the armatures if the individual armatures are provided with teeth and the number of poles Np and the number of slots Ns are properly determined to satisfy conditions defined by inequality (4) above.

Third Embodiment

Figure 8:
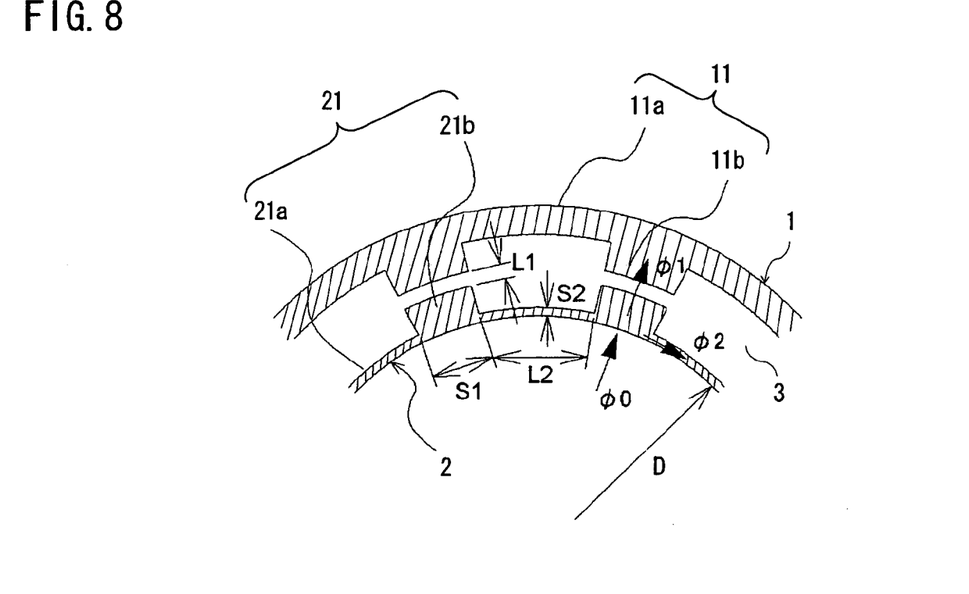
FIG. 8 is a fragmentary transverse cross-sectional view of a variable-speed permanent magnet motor according to a third embodiment of the invention.

FIG. 8 is a fragmentary transverse cross-sectional view of a variable-speed permanent magnet motor according to a third embodiment of the invention, in which elements identical or equivalent to those of the first embodiment shown in FIGS. 1 and 2 are designated by the same reference numerals. For the sake of simplicity of illustration, armature coils and a rotor 5 are not shown in FIG. 8.

What is characteristic of the motor of the third embodiment is that concentrically arranged first and second armatures 1, 2 have their respective teeth 11b, 21b, and the teeth 21b of the second armature 2 are joined together by a cylindrical magnetic ring 21a.

More specifically, as is the case with the above-described first and second embodiments, the first armature 1 includes an armature core 11 of which teeth 11b are formed on a curved inner surface of a cylindrical core back 11a along a circumferential direction and the aforementioned unillustrated armature coils which are fitted in slots formed by the successive teeth 11b. On the other hand, the second armature 2 includes an armature core 21 of which teeth 21b are formed on a curved outer surface of the cylindrical magnetic ring 21a at regular intervals along the circumferential direction and the aforementioned unillustrated armature coils which are fitted in slots formed by the successive teeth 21b. The magnetic ring 21a and the teeth 21b are one-piece formed by laminating patterned sheets obtained by blanking (die cutting) operation, for example, to impart stiffness to the second armature 2 in the motor of the third embodiment. In one variation of the embodiment, the armature core 21 may be produced by separately forming the magnetic ring 21a and the teeth 21b and joining the magnetic ring 21a and the teeth 21b into a single structure by using molding resin, for example.

Now, an advantage offered by the above-described structure of the third embodiment in which the second armature 2 includes the magnetic ring 21a having the teeth 21b is discussed.

Expressing the outside diameter of the rotor 5 by D and the number of poles formed by the permanent magnets 53 by Np, a pole-to-pole angular interval W of the second armature 2 is expressed by equation (5) below:

$$W = \pi D / Np \qquad (5)$$

Because the motor is designed such that magnetic flux densities B (of which peak value is B0) produced by the permanent magnets 53 on the rotor 5 are typically distributed in a generally sinusoidal pattern along the circumferential direction, an average value Ba of the magnetic flux densities is given by $Ba = 2B0/\pi$. Also, because the motor is designed such that magnetic flux produced by approximately one pole of the permanent magnet 53 is linked to one tooth 21b in the case of a concentrated winding type, there is a relationship expressed by equation (6) below:

$$S1/W = Ba/Bt \qquad (6)$$

where Bt is the magnetic flux density at an outermost end of each tooth 21b of the second armature 2 and S1 is the width of each tooth 21b as measured along the circumferential direction.

Substituting equation (5) for W in equation (6), equation (6) can be rewritten as follows:

$$S1 = (2D \cdot Bo)/(Np \cdot Bt) \qquad (7)$$

Here, it is assumed that magnetic flux produced by the permanent magnets 53 is $\phi 0$, magnetic flux passing through each tooth 21b of the second armature 2 is $\phi 1$ and magnetic flux passing (or leaking) to the magnetic ring 21a is $\phi 2$ as shown in FIG. 8. Given the ratio 1/K of maximum permissible leakage flux passing through the magnetic ring 21a to total magnetic flux, there is a relationship expressed by inequality (8):

$$\phi 1 > K \cdot \phi 2 \qquad (8)$$

Generally, magnetic flux is proportional to the cross-sectional area and relative permeability of a magnetic path and inversely proportional to the length of the magnetic path. Thus, inequality (8) can be rewritten as follows:

$$\mu s1 \cdot S1L1 > \mu s2 \cdot S2/L2 \qquad (9)$$

where $\mu s1$ is relative permeability of a gap 3 between the first and second armatures 1, 2, $\mu s2$ is relative permeability of the armature cores 11, 21 of the first and second armatures 1, 2, L1 is the distance between the teeth 11b of the first armature 1 and the teeth 21b of the second armature 2 as measured in a radial direction, L2 is the distance between one tooth 21b and the next of the second armature 2 as measured along the circumferential direction, S1 is the width of each tooth 21b, and S2 is the thickness of the magnetic ring 21a of the second armature 2.

The distance L2 is what is obtained by subtracting the width S1 of each tooth 21b from a slot-to-slot interval of the second armature 2. Thus, given the number of slots Ns of the second armature 2, $L2 = \pi D/Ns - S1$. Since the gap 3 between the first and second armatures 1, 2 is usually a layer filled with a nonmagnetic material or air, $\mu s1 = 1$. Thus, inequality (9) can be rewritten as follows:

$$S2 < 2B0 \cdot D^2 \{(\pi/Ns) - 2B0/(Np \cdot Bt)\}/(\mu s2 \cdot L1 \cdot K \cdot Np \cdot Bt) \qquad (10)$$

Figure 9:
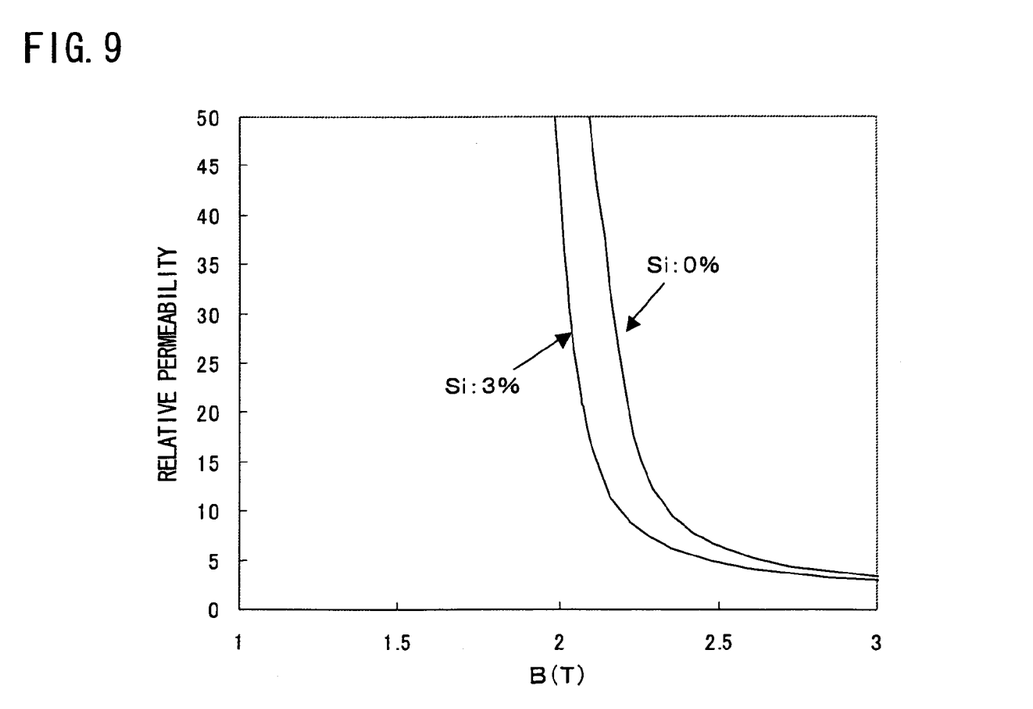
FIG. 9 is a graphical representation of characteristic curves showing how relative permeability of typical electromagnetic steel sheets varies with changes in magnetic flux density.

FIG. 9 is a graphical representation of characteristic curves showing how relative permeability of typical electromagnetic steel sheets varies with changes in magnetic flux density. The horizontal axis of FIG. 9 represents the magnetic flux density B and the vertical axis represents the relative permeability $\mu s$. One of the two curves shown in FIG. 9 is for an electromagnetic steel sheet containing 3% of silicon (Si) as an additive and the other is for an electromagnetic steel sheet containing no silicon.

Most magnetic materials used for forming a magnetic path typically contain 3% or less of silicon. For this reason, the relative permeability of magnetic paths formed in an armature core rapidly drops down to 10 or less causing the magnetic paths to become magnetically saturated when the magnetic flux density goes beyond a point of about 2T.

In the motor of the third embodiment structured as described above, the magnetic ring 21a of the second armature 2 is used in a magnetically completely saturated condition and, therefore, the relative permeability of the magnetic ring 21a becomes approximately 10 or less as can be seen from the characteristic curve of FIG. 9. Hence, the relative permeability $\mu s$ is set to 10 and the below-described mathematical operation is performed.

Figure 10:
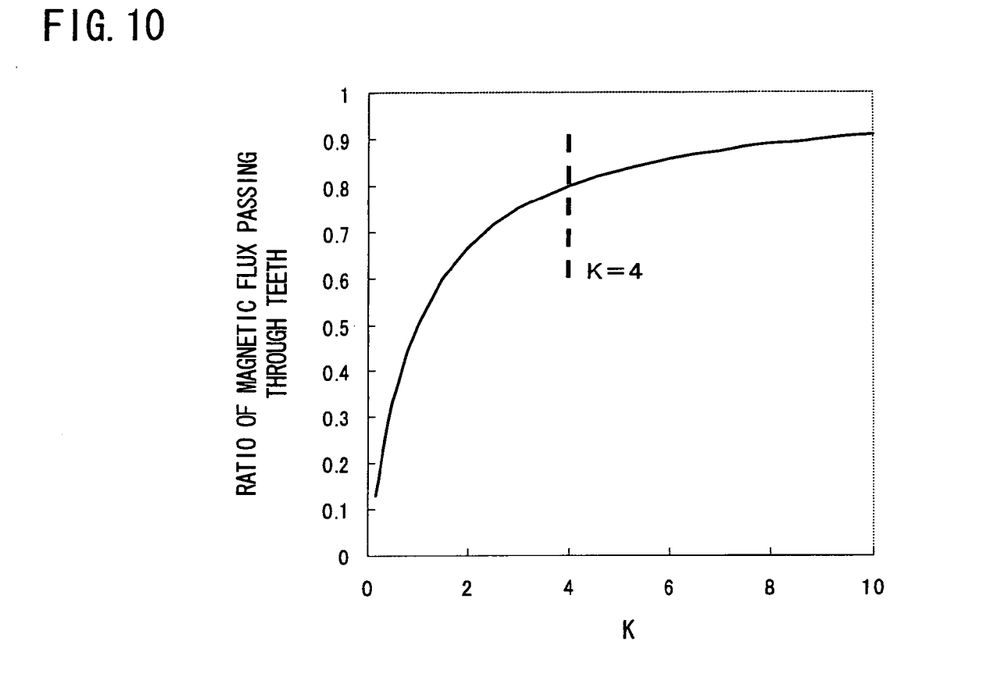
FIG. 10 is a graphical representation of a relationship between magnetic flux produced by permanent magnets of a rotor and the ratio of magnetic flux passing through individual teeth of a second armature to total magnetic flux in the motor of FIG. 8.

FIG. 10 is a graphical representation of a relationship between the magnetic flux $\phi 0$ produced by the permanent magnets 53 and the ratio of magnetic flux passing through the individual teeth 21*b* of the second armature 2 to the total magnetic flux. It can be recognized from FIG. 10 that the magnetic flux passing through the teeth 21*b* rapidly decreases when the value of K becomes approximately 3 or less. Therefore, leakage flux can be limited to or below a permissible level if the value of K is approximately 3 or above. To provide some more allowance, the value of K is set to 4 (K=4) in the present embodiment. Typically, a permanent magnet motor is designed such that the peak value B0 of magnetic flux density is approximately 1T and the magnetic flux density Bt at an outermost end of each tooth is approximately 2T. In the motor of the present embodiment, the peak value B0 is set to 1 (B0=1) and the magnetic flux density Bt is set to 2 (Bt=2).

Substituting these values into the aforementioned inequality (10), inequality (11) below is obtained:

$$S2 < D^2 \{(\pi/Ns) - (1/Np)\}/(40 \cdot L1 \cdot Np) \tag{11}$$

It is understood from the foregoing discussion that the magnetic flux $\phi 2$ leaking to the magnetic ring 21*a* can be limited below the maximum permissible leakage flux by setting the thickness S2 of the magnetic ring 21*a* to a value satisfying conditions defined by inequality (11) above.

In the permanent magnet motor of the third embodiment, the second armature 2 includes the magnetic ring 21*a* of which thickness S2 satisfies the conditions of inequality (11) as discussed above. This structure of the third embodiment is advantageous in that it is possible to increase mechanical strength of the second armature 2 to impart high stiffness thereto while keeping the magnetic flux leaking into the magnetic ring 21*a* below a permissible level.

Figure 11:
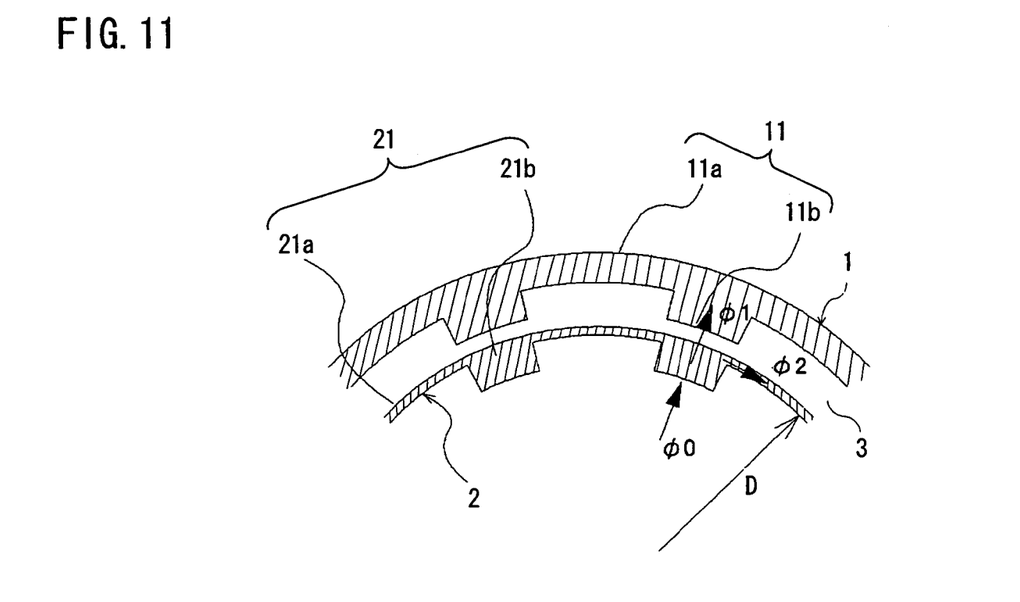
FIG. 11 is a fragmentary transverse cross-sectional view of a variable-speed permanent magnet motor in one modified form of the third embodiment.

While the magnetic ring 21*a* is located on the inside of the teeth 21*b* in the above-described structure of the third embodiment (FIG. 8), the invention is not limited thereto. For example, the motor of this embodiment may be modified such that the magnetic ring 21*a* is located on the outside of the teeth 21*b* as shown in FIG. 11. A variable-speed permanent magnet motor thus structured produces substantially the same advantageous effects as the motor of the third embodiment.

Additionally, since both the first and second armatures 1, 2 have their respective teeth 11*b*, 21*b* in the foregoing third embodiment, the motor of the third embodiment can be run at variable speeds in a well-controlled fashion as in the second embodiment if the number of poles Np and the number of slots Ns are properly determined to satisfy the conditions of the aforementioned inequality (4).

Fourth Embodiment

Figure 12:
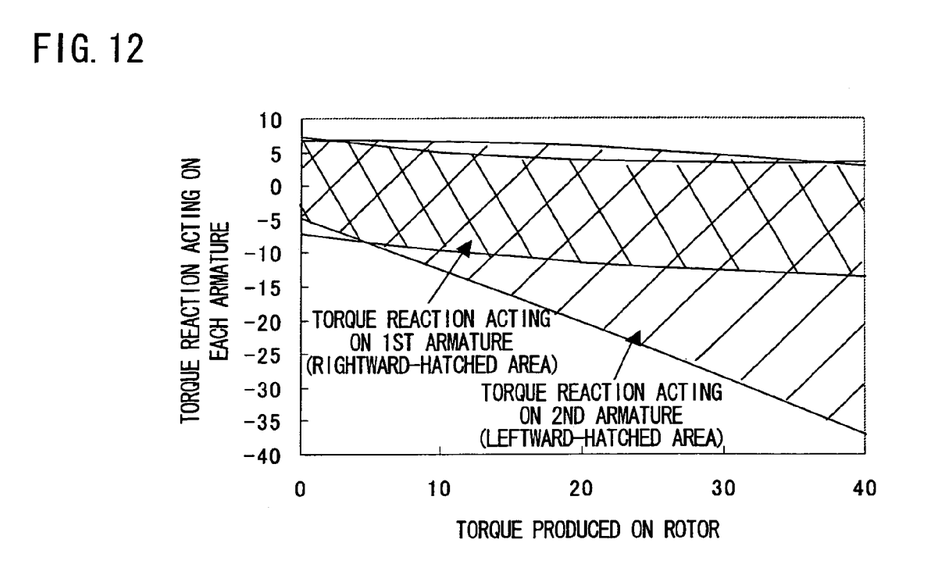
FIG. 12 is a graphical representation of characteristic curves of a variable-speed permanent magnet motor according to a fourth embodiment of the invention in which both first and second armatures have their respective teeth, the characteristic curves showing results of a study of the magnitude of torque reactions acting on the first and second armatures due to a torque produced on a rotor.

FIG. 12 is a graphical representation of characteristic curves of a variable-speed permanent magnet motor according to a fourth embodiment of the invention in which both first and second armatures 1, 2 have their respective teeth 11*b*, 21*b* as in the third embodiment (FIG. 8), for example, the characteristic curves showing results of a study of the magnitude of torque reactions acting on the first and second armatures 1, 2 due to a torque produced on a rotor 5. The horizontal axis of FIG. 12 represents the torque produced on the rotor 5 and the vertical axis represents the torque reaction acting on each of the first and second armatures 1, 2. The magnitude of the torque reactions acting on the first and second armatures 1, 2 varies with the relative electrical angle between the first and second armatures 1, 2. Ranges of the magnitude of the torque reactions are shown by hatching in FIG. 12 for both the first and second armatures 1, 2.

It is seen from FIG. 12 that when the first and second armatures 1, 2 have their respective teeth 11*b*, 21*b*, the absolute value of the torque reaction acting on the second armature 2 is larger than that acting on the first armature 1.

Thus, in the motor of the fourth embodiment in which the first and second armatures 1, 2 are provided with the teeth 11*b*, 21*b*, respectively, it is advantageous if the second armature 2 acted upon by the torque reaction of a larger absolute value is fixedly mounted and the first armature 1 acted upon by the torque reaction of a smaller absolute value is rotatably mounted for quickly varying the relative electrical angle between the first and second armatures 1, 2 unlike the case of the first embodiment. This is because the first armature 1 can be turned with a smaller external force and with a simpler support structure.

Such a support structure can be realized by fixedly mounting the second armature 2 to a housing 6 via a support cylinder 7, attaching the first armature 1 to another support cylinder which is rotatably mounted on the outside of the second armature 2, and providing a driving motor outside the housing 6 for turning the support cylinder to which the first armature 1 is attached, for example.

When the first and second armatures 1, 2 are provided with the respective teeth 11*b*, 21*b* as stated above, the aforementioned structure of the fourth embodiment is advantageous in that the relative electrical angle between the first and second armatures 1, 2 can be quickly varied by turning the first armature 1 acted upon by the torque reaction of a smaller absolute value with a small external force around the fixed second armature 2.

This point of the structure of the fourth embodiment is similarly applicable to the earlier-described structure of the motor of the second embodiment (FIG. 5) in which the first armature 1 is provided with the teeth 11*b* and the second armature 2 is provided with the teeth 23. In addition, although the fourth embodiment has been described with reference to an example provided with the two armatures 1, 2, the structure of the embodiment is also applicable to a motor having three or more concentrically arranged armatures.

Fifth Embodiment

Figure 13:
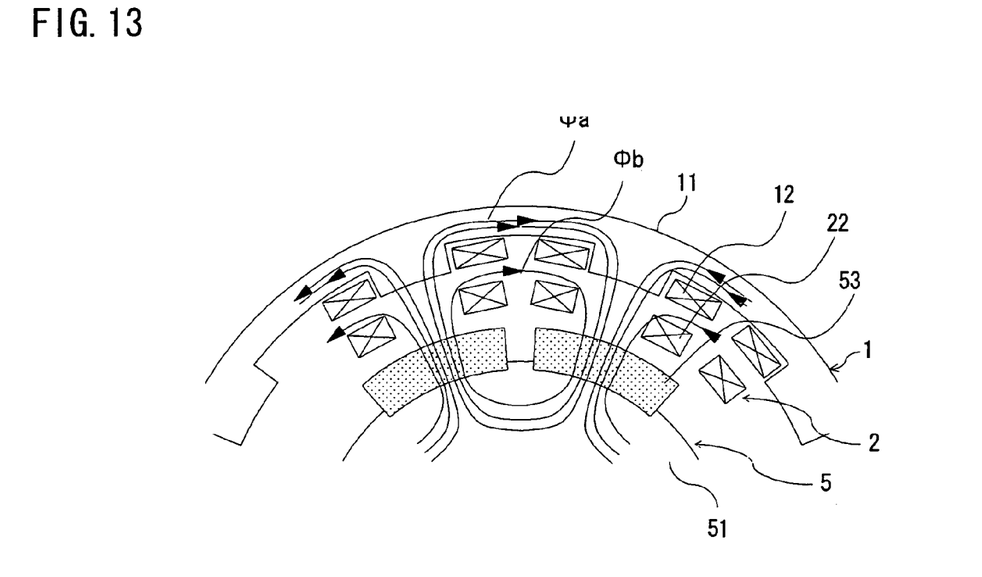
FIG. 13 is an explanatory diagram generally showing how magnetic flux produced by permanent magnets of a rotor is linked to armature coils of a second armature and to armature coils of a first armature in a variable-speed permanent magnet motor according to a fifth embodiment of the invention.

FIG. 13 is an explanatory diagram generally showing how magnetic flux produced by permanent magnets 53 of a rotor 5 is linked to armature coils 22 of a second armature 2 and to armature coils 12 of a first armature 1 in a variable-speed permanent magnet motor according to a fifth embodiment of the invention. In the following discussion, the armature coils 12 of the first armature 1 and the armature coils 22 of the second armature 2 are referred to simply as the first armature coils 12 and the second armature coils 22, respectively.

The magnetic flux produced by the permanent magnets 53 fitted to the rotor 5 is linked to both the first armature coils 12 and the second armature coils 22. As depicted in FIG. 13, the magnetic flux produced by the permanent magnets 53 can be divided into two portions, that is, magnetic flux $\Phi a$ linked to the first armature coils 12 and magnetic flux $\Phi b$ formed along looping paths without being scarcely linked to the first armature coils 12. This means that if the number of turns of each first armature coil 12 is equal to that of each second armature coil 22, the magnetic flux $\Phi a$ linked to the first armature coils 12 is smaller and, as a consequence, a voltage induced in each first armature coil 12 becomes lower than a voltage induced in each second armature coil 22. Thus, the combined voltage induced in the first and second armature coils 12, 22 of each phase can not be approximately zeroed even when the relative electrical angle between the first and second armatures 1, 2 in the circumferential direction is set to 180 degrees.

Figure 14:
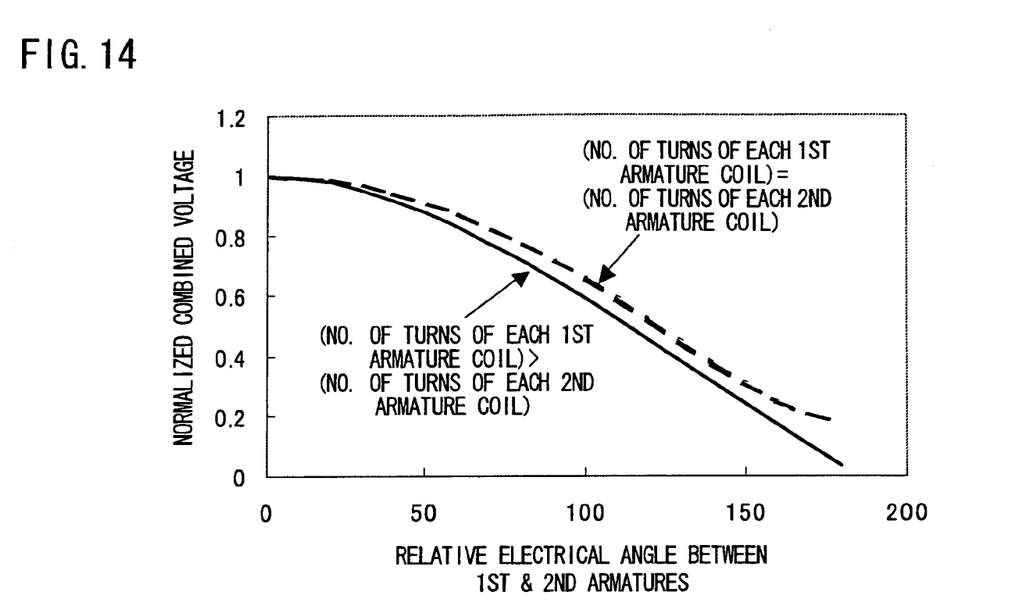
FIG. 14 is a graphical representation of characteristic curves obtained by analyzing electromagnetic fields produced by the sums of voltages (combined voltages) induced in armature coils of individual phases when the electrical angular positions of the first and second armatures are relatively varied in a circumferential direction in a case where the number of turns of each armature coil of the first armature is larger than the that of each armature coil of the second armature and in a case where the number of turns of each armature coil of the first armature is equal to that of each armature coil of the second armature.

FIG. 14 is a graphical representation of characteristic curves obtained by analyzing electromagnetic fields produced by the sums of voltages (combined voltages) induced in the first and second armature coils 12, 22 of the individual phases when the electrical angular positions of the first and second armatures 1, 2 are relatively varied in the circumferential direction in a case where the number of turns of each first armature coil 12 is larger than the that of each second armature coil 22 and in a case where the number of turns of each first armature coil 12 is equal to that of each second armature coil 22. The horizontal axis of FIG. 14 represents a relative electrical angle between the first and second armatures 1, 2 in the circumferential direction and the vertical axis represents a normalized combined voltage induced in the armature coils 12, 22 of one phase of the two armatures 1, 2.

It can be seen from FIG. 14 that although the combined voltage induced in the first and second armature coils 12, 22 of each phase can be approximately zeroed when the number of turns of each first armature coil 12 is larger than the that of each second armature coil 22, the combined voltage can not be approximately zeroed when the number of turns of each first armature coil 12 is equal to that of each second armature coil 22.

Since the combined voltage is normalized in FIG. 14, the reciprocal of the normalized combined voltage at a point of 180 degrees on the horizontal axis indicates a maximum variable ratio of the combined voltage. The maximum variable ratio of the combined voltage is approximately 30 when the number of turns of each first armature coil 12 is larger than the that of each second armature coil 22, whereas the maximum variable ratio of the combined voltage is approximately 5.6 when the number of turns of each first armature coil 12 is equal to that of each second armature coil 22. When the number of turns of each first armature coil 12 is made larger than the that of each second armature coil 22, the maximum variable ratio of the combined voltage increases and, as a consequence, the combined voltage induced in the first and second armature coils 12, 22 of each phase can be varied within a larger range by changing the relative electrical angle between the first and second armatures 1, 2. Therefore, the motor of the fifth embodiment can be more easily run at variable speeds in a controlled fashion by field-weakening control.

While the second armature 2 has no teeth in the aforementioned structure of the fifth embodiment shown in FIG. 13, the motor of the embodiment may be modified such that the second armature 2 has teeth as in the motor of the second and third embodiments, yet offering the same advantageous effects of the invention as thus far discussed. In addition, the structure of the fifth embodiment is also applicable to a motor having three or more concentrically arranged armatures, yet offering the same advantageous effects of the invention as thus far discussed, if the number of turns of each armature coil is successively increased from one armature to the next radially outward to make up for a decrease in the amount of linkage of the magnetic flux produced by the permanent magnets 53 of the rotor 5 to the armature coils of the individual armatures.

Sixth Embodiment

Figure 15A:
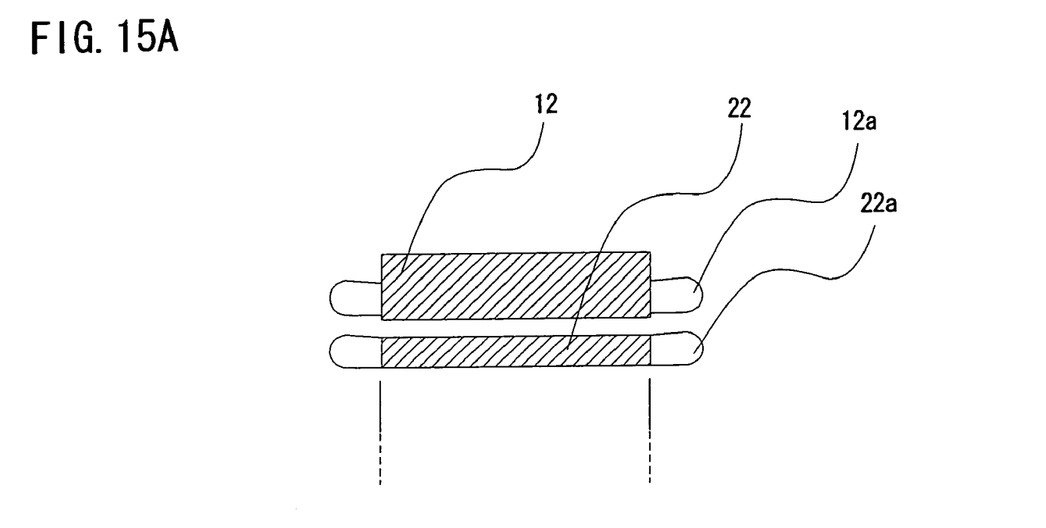
FIG. 15A is a fragmentary longitudinal cross-sectional view of a variable-speed permanent magnet motor according to a sixth embodiment of the invention in which armature coils of first and second armatures are concentratedly wound.
Figure 15B:
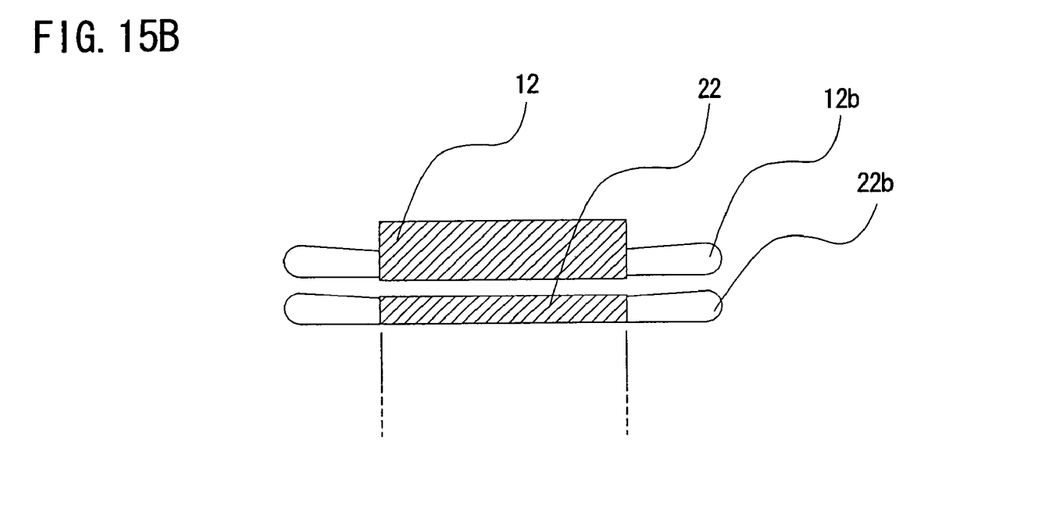
FIG. 15B is a fragmentary longitudinal cross-sectional view of a variable-speed permanent magnet motor shown as a comparative example of the motor of FIG. 15A in which armature coils of first and second armatures are distributively wound.

FIG. 15A is a fragmentary longitudinal cross-sectional view of a variable-speed permanent magnet motor according to a sixth embodiment of the invention in which armature coils 12, 22 of first and second armatures 1, 2 are concentratedly wound, and FIG. 15B is a fragmentary longitudinal cross-sectional view of a variable-speed permanent magnet motor shown as a comparative example in which armature coils 12, 22 of first and second armatures 1, 2 are distributively wound. In these Figures, rotors and associated elements are not shown and only one of axially symmetric portions of each motor is depicted for the sake of simplicity of illustration.

As can be seen from these Figures, coil end portions 12b, 22b of the distributively wound armature coils 12, 22 of FIG. 15B are considerably larger in size than coil end portions 12a, 22a of the concentratedly wound armature coils 12, 22 of FIG. 15A. Since the coil end portions 12a, 22a of the concentratedly wound armature coils 12, 22 (FIG. 15A) are lighter than the coil end portions 12b, 22b of the distributively wound armature coils 12, 22 (FIG. 15B), the coil end portions 12a, 22a of the concentratedly wound armature coils 12, 22 have a smaller moment of inertia. Thus, the motor of the sixth embodiment (FIG. 15A) is advantageous over the motor of the comparative example (FIG. 15B) in that the relative electrical angle between the first and second armatures 1, 2 can be quickly varied. It is therefore advantageous to concentratedly wind the armature coils 12, 22 of the first and second armatures 1, 2 regardless of whether the first armature 1 or the second armature 2 is turned for varying the relative electrical angle between the first and second armatures 1, 2.

While the invention has thus far been described as being implemented in the variable-speed permanent magnet motors in the foregoing first to sixth embodiments, the invention is not limited thereto but is similarly applicable to variable-speed permanent magnet generators as

What is claimed is:

1. A variable-speed rotating electric machine using permanent magnets, said rotating electric machine comprising:
   at least two armatures having respective armature coils for multiple phases; and
   a rotor having said permanent magnets;
   wherein said armatures are arranged concentrically with each other in such a manner that electrical angular positions of said individual armatures can be relatively varied in a circumferential direction, the armature coils of each phase are series-connected, and said rotor is arranged concentrically with said armatures on the inside thereof,
   wherein an armature located in an outermost part is fixedly mounted and another armature is rotatably mounted such that a smaller moment of inertia occurs when the electrical angular positions of said armatures are relatively changed, and
   wherein only the armature located in the outermost part has teeth.

2. The variable-speed rotating electric machine according to claim 1, further comprising:
   a shaft fitted on a central axis of the rotor; and
   bearings configured to support the shaft at both ends.

3. A variable-speed rotating electric machine using permanent magnets, said rotating electric machine comprising:
   at least two armatures having respective armature coils for multiple phases; and
   a rotor having said permanent magnets;
   wherein said armatures are arranged concentrically with each other in such a manner that electrical angular positions of said individual armatures can be relatively varied in a circumferential direction, the armature coils of each phase are series-connected, and said rotor is arranged concentrically with said armatures on the inside thereof, and
   wherein all said armatures have respective teeth.

4. The variable-speed rotating electric machine according to claim 3, wherein the total number of armatures is two, the teeth of an inner armature are joined together by a magnetic ring, and wherein a thickness S2 of the magnetic ring is determined to satisfy conditions defined by $S2 < D^2\{(\pi/Ns) - (1/Np)\}/(40 \cdot L1 \cdot Np)$, where Ns is a number of slots, Np is a number of poles, D is the outside diameter of said rotor, and L1 is the distance between the at least two armatures as measured in a radial direction.

5. The variable-speed rotating electric machine according to claim 4, wherein the teeth of the inner armature and the magnetic ring together form a single structure.

6. The variable-speed rotating electric machine according to claim 3, wherein a number of slots Ns and a number of poles Np are determined to satisfy conditions defined by Ns<N·Np/2, where N is the total number of armatures.

7. The variable-speed rotating electric machine according to claim 3, wherein an armature located in an innermost part is fixedly mounted and another armature is rotatably mounted such that a smaller torque reaction acts when the electrical angular positions of said armatures are relatively changed.

8. The variable-speed rotating electric machine according to claim 3, further comprising:
 a shaft fitted on a central axis of the rotor; and
 bearings configured to support the shaft at both ends.

9. A variable-speed rotating electric machine using permanent magnets, said rotating electric machine comprising:
 at least two armatures having respective armature coils for multiple phases; and
 a rotor having said permanent magnets;
 wherein said armatures are arranged concentrically with each other in such a manner that electrical angular positions of said individual armatures can be relatively varied in a circumferential direction, the armature coils of each phase are series-connected, and said rotor is arranged concentrically with said armatures on the inside thereof, and
 wherein a number of turns of each armature coil is successively increased from one armature to the next radially outward.

10. A variable-speed rotating electric machine using permanent magnets, said rotating electric machine comprising:
 at least two armatures having respective armature coils for multiple phases; and
 a rotor having said permanent magnets;
 wherein said armatures are arranged concentrically with each other in such a manner that electrical angular positions of said individual armatures can be relatively varied in a circumferential direction, the armature coils of each phase are series-connected, and said rotor is arranged concentrically with said armatures on the inside thereof, and
 wherein the armature coils are concentratedly wound on said respective armatures.

* * * * *